United States Patent
Marette

(10) Patent No.: US 9,828,990 B1
(45) Date of Patent: Nov. 28, 2017

(54) FIGURE EIGHT PINION BEARING SUPPORT

(71) Applicant: J-Mac Tool, Inc., Fort Worth, TX (US)

(72) Inventor: Michael David Marette, Fort Worth, TX (US)

(73) Assignee: FORUM US, INC., Houston, TX (US)

( * ) Notice: Subject to any disclaimer, the term of this patent is extended or adjusted under 35 U.S.C. 154(b) by 37 days.

(21) Appl. No.: 14/638,813

(22) Filed: Mar. 4, 2015

Related U.S. Application Data

(60) Provisional application No. 61/947,677, filed on Mar. 4, 2014.

(51) Int. Cl.
  F16H 57/02   (2012.01)
  F04B 53/16   (2006.01)
  F16H 57/021  (2012.01)

(52) U.S. Cl.
  CPC ........... *F04B 53/16* (2013.01); *F16H 57/021* (2013.01)

(58) Field of Classification Search
  CPC ........... F16H 57/021; F16H 2057/0213; F16H 2057/0216; F16H 57/022; F16H 57/03; F16H 2048/405; F16H 2048/423; F04B 53/16
  See application file for complete search history.

(56) References Cited

U.S. PATENT DOCUMENTS

| | | | |
|---|---|---|---|
| 3,175,283 A * | 3/1965 | Baudras-Chardigny | B21D 53/90 29/463 |
| 3,605,516 A * | 9/1971 | Hausinger | F16C 19/54 74/401 |
| 5,911,793 A * | 6/1999 | Kaye | B63H 23/06 74/606 R |
| 6,202,507 B1 * | 3/2001 | Phillips | F16H 57/021 74/606 R |
| 6,253,640 B1 * | 7/2001 | Phillips | F16H 57/029 74/606 R |
| 2006/0067598 A1 * | 3/2006 | Engle et al. | F16H 57/021 384/626 |
| 2006/0196304 A1 * | 9/2006 | Konruff | F16H 57/023 74/606 R |
| 2008/0169409 A1 * | 7/2008 | Kim | F16H 57/021 248/674 |

* cited by examiner

*Primary Examiner* — Adam D Rogers

(57) ABSTRACT

A bearing support design configured to provide increased resistance to deflection of a crankshaft within a power end. The bearing support design is contoured in the shape of a figure eight and provides an increased surface area for supporting the crankshaft and gearing. The support may be integrally formed in the frame plate of the power end or may alternatively be retrofitted into an existing frame plate and thereby be welded in. The power end having a bearing support at each end of the crankshaft.

26 Claims, 6 Drawing Sheets

FIGURE EIGHT PINION BEARING SUPPORT

BACKGROUND

1. Field of the Invention

The application relates generally to power ends and, more particularly, to a bearing support located on each power end frame plate.

2. Description of Related Art

It is difficult to economically produce hydrocarbons from low permeability reservoir rocks. Oil and gas production rates are often boosted by hydraulic fracturing, a technique that increases rock permeability by opening channels through which hydrocarbons can flow to recovery wells. During hydraulic fracturing, a fluid is pumped into the earth under high pressure (sometimes as high as 50,000 PSI) where it enters a reservoir rock and cracks or fractures it. Large quantities of proppants are carried in suspension by the fluid into the fractures. When the pressure is released, the fractures partially close on the proppants, leaving channels for oil and gas to flow.

Specialized pump systems are used to deliver fracture fluids at sufficiently high rates and pressures to complete a hydraulic fracturing procedure or "frac job." Positive displacement pumps used in Oil Field Well Service Applications are operated, serviced & maintained in harsh environments & operating conditions. These pump systems are usually provided with power ends and fluid ends. Power ends induce movement of a plunger within the fluid end that places fluids under pressure. Within these fluid ends are a number of reciprocating plungers that pressurize fracture fluids. Suction valves and discharge valves control fluid flow to, and from, the plungers.

Power ends use large bull gears and pinion shafts to drive the power end crankshafts and typically have large amounts of pinion shaft deflection. In use, the bull gears and pinion shafts usually deflect away from the bull gear causing excessive strain on the pinion bearings, excessive wear on the bull gear and pinion teeth, and excessive strain in the power frames. Such deflection is seen in FIG. 1. These issues typically arise because narrow outer power frame plates are used (less than 1" typically). The lower weight designs commonly used struggle to support the dynamic separation force loads generated by the bull and pinion gear high loads. When failure occurs, cracks can develop in the power frame plates as seen in FIG. 3. In an attempt to strengthen the power frame plates, housings may be bolted on to hold the pinion bearings to the thin outer frame plates. However, this fails to adequately increase the strength of the frame plates, as seen in FIGS. 2 and 3.

Although great strides have been made in power ends, considerable shortcomings remain.

DESCRIPTION OF THE DRAWINGS

The novel features believed characteristic of the invention are set forth in the description. However, the invention itself, as well as a preferred mode of use, and further objectives and advantages thereof, will best be understood by reference to the following detailed description when read in conjunction with the accompanying drawings, wherein.

Figure 1:
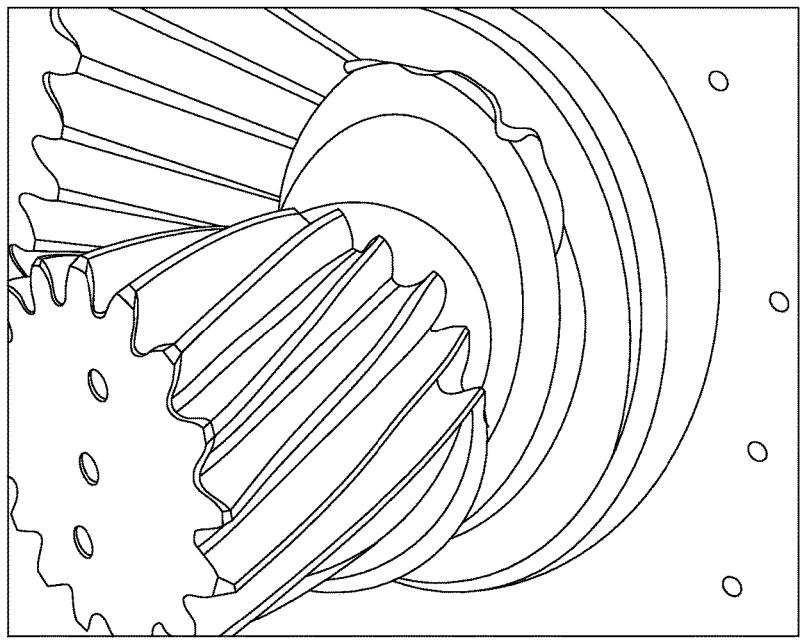
FIG. 1 is a perspective view of a pinion gear and a bull gear in a power end frame plate.
Figure 2:
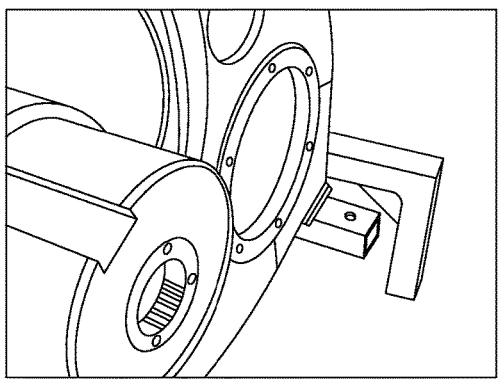
FIG. 2 is a view of the power end frame plate of FIG. 1 with a housing attached.
Figure 3:
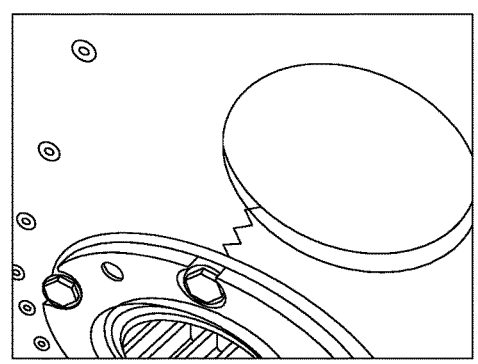
FIG. 3 is an enlarged view of the power end frame plate of FIG. 2, the power end frame plate showing cracks.

While the system of the present application is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the present application as described herein.

DETAILED DESCRIPTION OF THE PREFERRED EMBODIMENT

An illustrative embodiment of the invention is described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 4:
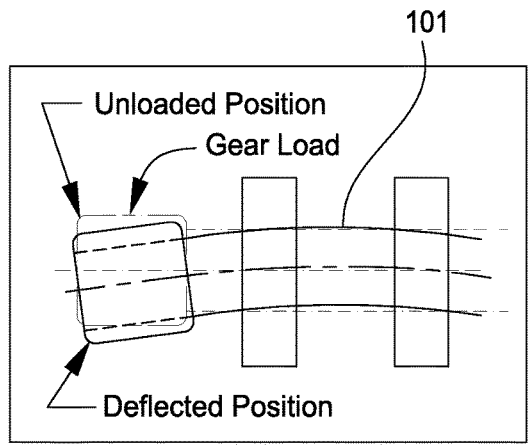
FIG. 4 is a chart illustrating the deflection resulting in a crankshaft in a power end according to the preferred embodiment of the present application.
Figure 5:
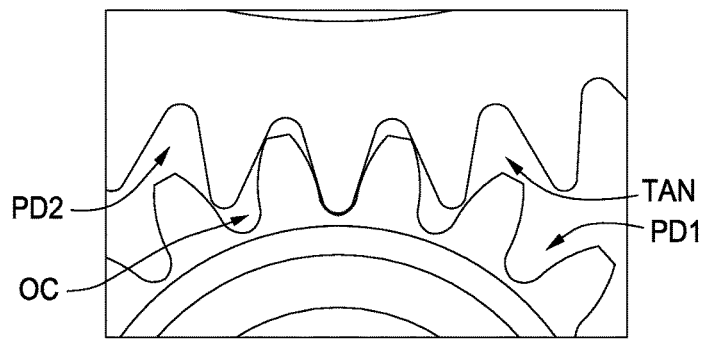
FIG. 5 is an enlarged side view of the teeth of a bull gear and pinion gear in operation with the power end of FIG. 4.
Figure 6:
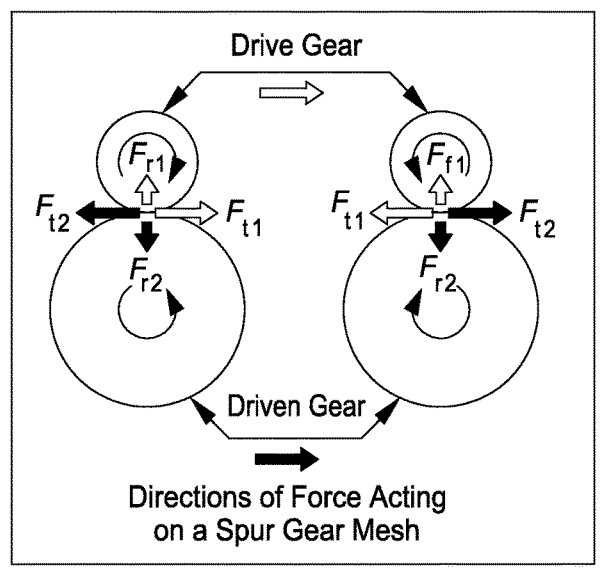
FIG. 6 is a diagram of the force loads acting on the bull gear and pinion gears of FIG. 5.

Referring to FIGS. 4-6 in the drawings, deflection forces exerted upon bull gears and pinion shafts configured to drive the power end crankshafts is illustrated. As seen in FIG. 4, crankshaft 101 is shown in an unloaded position and in a loaded position under stress. The deflection of crankshaft 101 can be seen. Deflection is caused by the naturally occurring separation forces that develop between the pinion gear and bull gear as the teeth push against each other during high loads (See FIG. 5). As seen in FIGS. 5 and 6, gear teeth are designed using rounded shapes that permit them to minimize friction as engagement occurs. The rounded shape allows them to "roll" against each other instead of "drag" as contact is made. The round surfaces result in indirect force transfers causing the gears to push apart as the "roll" effect moves the contact points above and below the direct line forces, thereby causing the deflection seen in FIG. 4.

Figure 7:
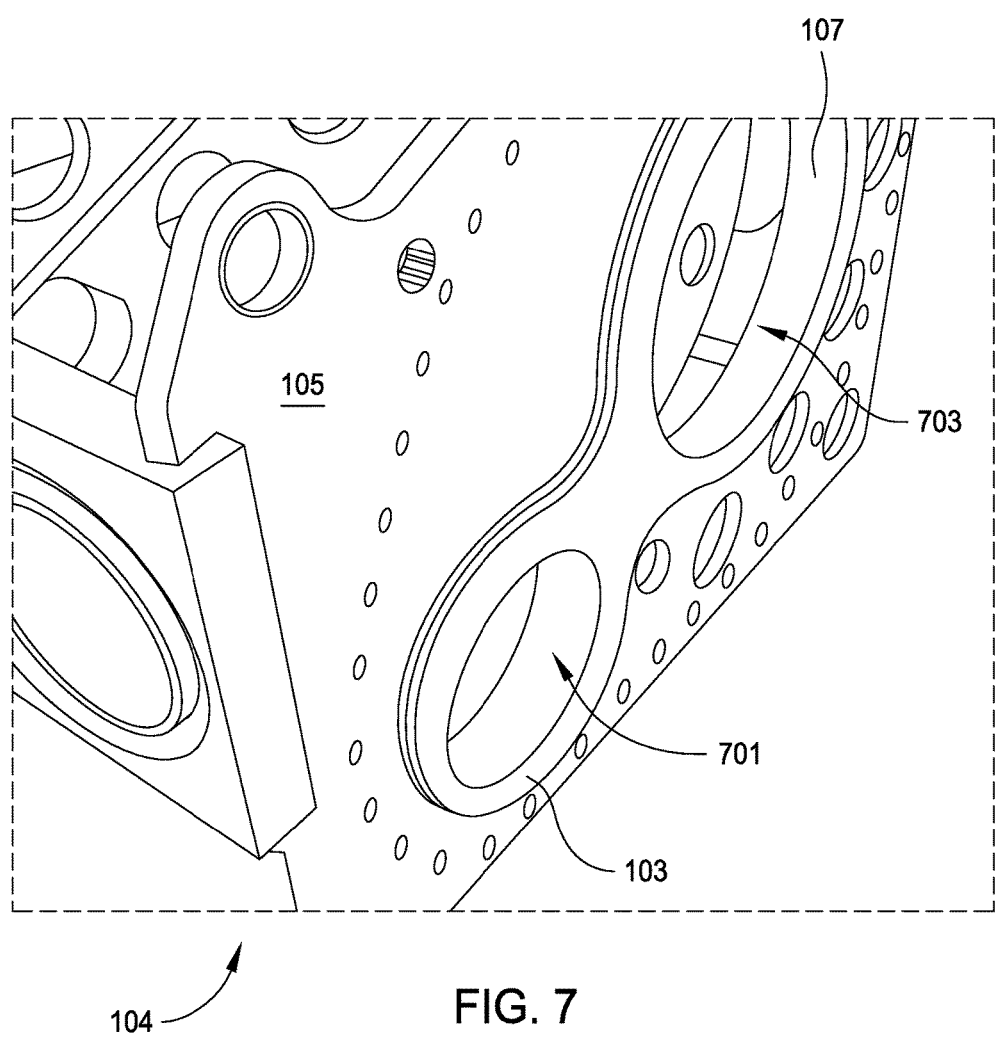
FIG. 7 is an orthogonal view of the frame plate as used in the power end of the preferred embodiment of the present application, the frame plate having a figure eight bearing support.

Referring now also to FIGS. 7-9C in the drawings, a figure eight pinion bearing support 103 is integrally formed in the power end frame plate 105. In the contemplated embodiment, support 103 is welded directly to the frame plate 105. Thus, the support slides within the openings 701, 703 formed by the plate 105, which in turn are configured to receive the bull gear and pinion therethrough. A transition opening 707 is formed between openings 701 and 703 as shown in FIG. 9B Thereafter, the support 103 is welded directly to the plate 105. The extra material and thickness of support 103 provides significant advantages. As noted previously, deflection in crankshaft 101 results in excessive strain on the pinion bearings, excessive wear on the bull gear and pinion teeth, and excessive strain in the power frames. The support overcomes these disadvantages by providing additional support and rigidity. One way this feature is achieved is by increasing the surface contact with the plate via the supports, as depicted in FIG. 7.

To effectively handle the natural deflection forces generated by the high horsepower gear loads, the present application discloses the use of support 103 integrally formed into frame plate 105. The use of support 103 minimizes weight added to the overall power end compared to externally detachable housings currently in use. The power end 104 includes a frame plate 105 at opposing ends of its body. Crankshaft 101 extends between each frame plate end. Use of support 103 on a single end of the power end is insufficient to handle the forces generated. In the preferred embodiment, support 103 is used at both ends of the power end in communication with the frame support 105 and crankshaft 101.

Figure 8:
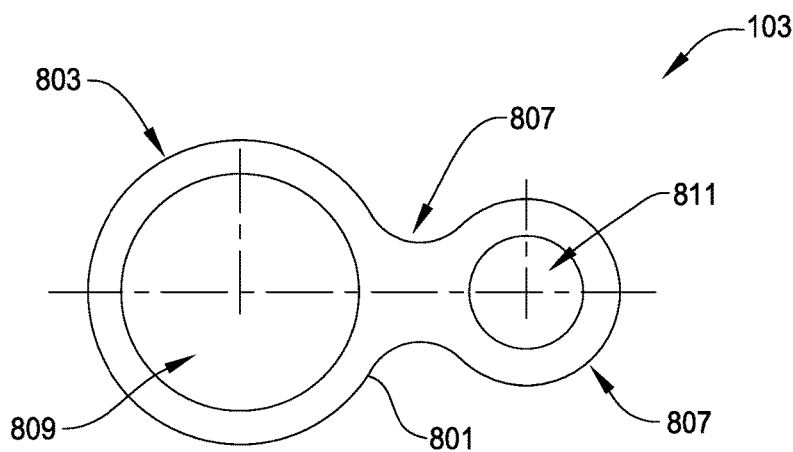
FIG. 8 is a side and end view of the figure eight bearing support of FIG. 7.
Figure 9A:
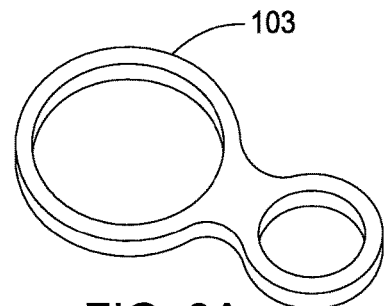
FIGS. 9A, 9B, and 9C are an illustration showing the figure eight bearing support inserts before and after installation into the power end frame plate.
Figure 9B:
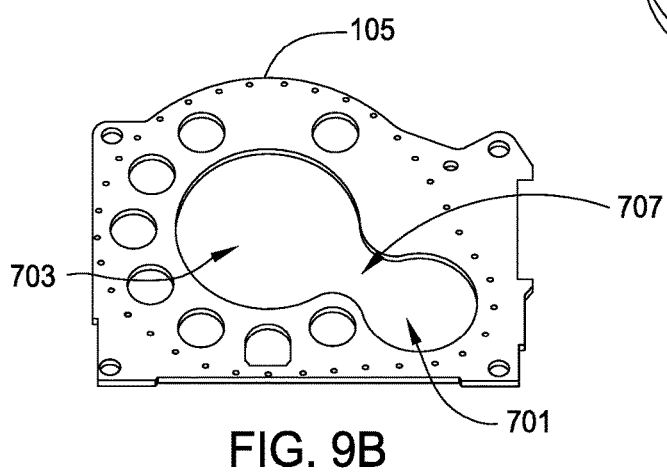
Figure 9C:
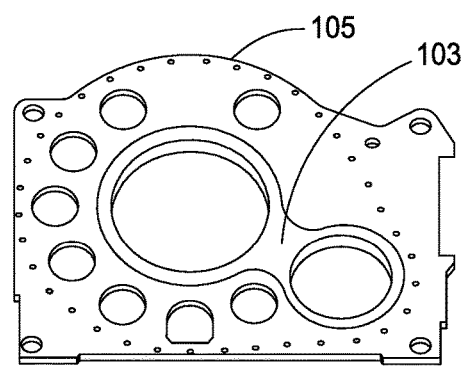

FIGS. 8-9C further illustrate the contoured shape and manner of assembly of support 103 in communication with that of frame plate 105. In particular, FIG. 8 illustrates a drawings for support 103, while FIGS. 9A-9C illustrates support 103 before and after installation and welding into frame plates 105.

As depicted in FIG. 8, frame support 103 is a robust and wide insert shaped to resemble a figure eight. In the preferred embodiment, support 103 includes a body 801 having a first circular end 803 integrally joined to a second circular end 805 via a transition member 807. First end 803 forms an opening 809 that receives the bull gear, while second end 807 forms an opening 811 that receives a pinion gear. As shown, both opening 809, 811 are coaxially aligned with each other.

In FIGS. 9A-9C, the assembly of plate 105 and support 103 are shown. In the contemplated embodiment, support 103 is welded inside the thinner outer power frame plates 105. By welding, support 103 is retrofittable with existing frame plates 105. Also, frame plates 105 may be integrally formed with support 103 to save the welding time during construction. Inner surface 107 of support 103 provides a full and rigid surface contact support for the pinion bearings. By displacing the forces acting upon frame plate 105 through crankshaft 101, the pinion bearings are properly supported and can handle the large naturally occurring separation forces generated by the bull and pinion gears.

Figure 10:
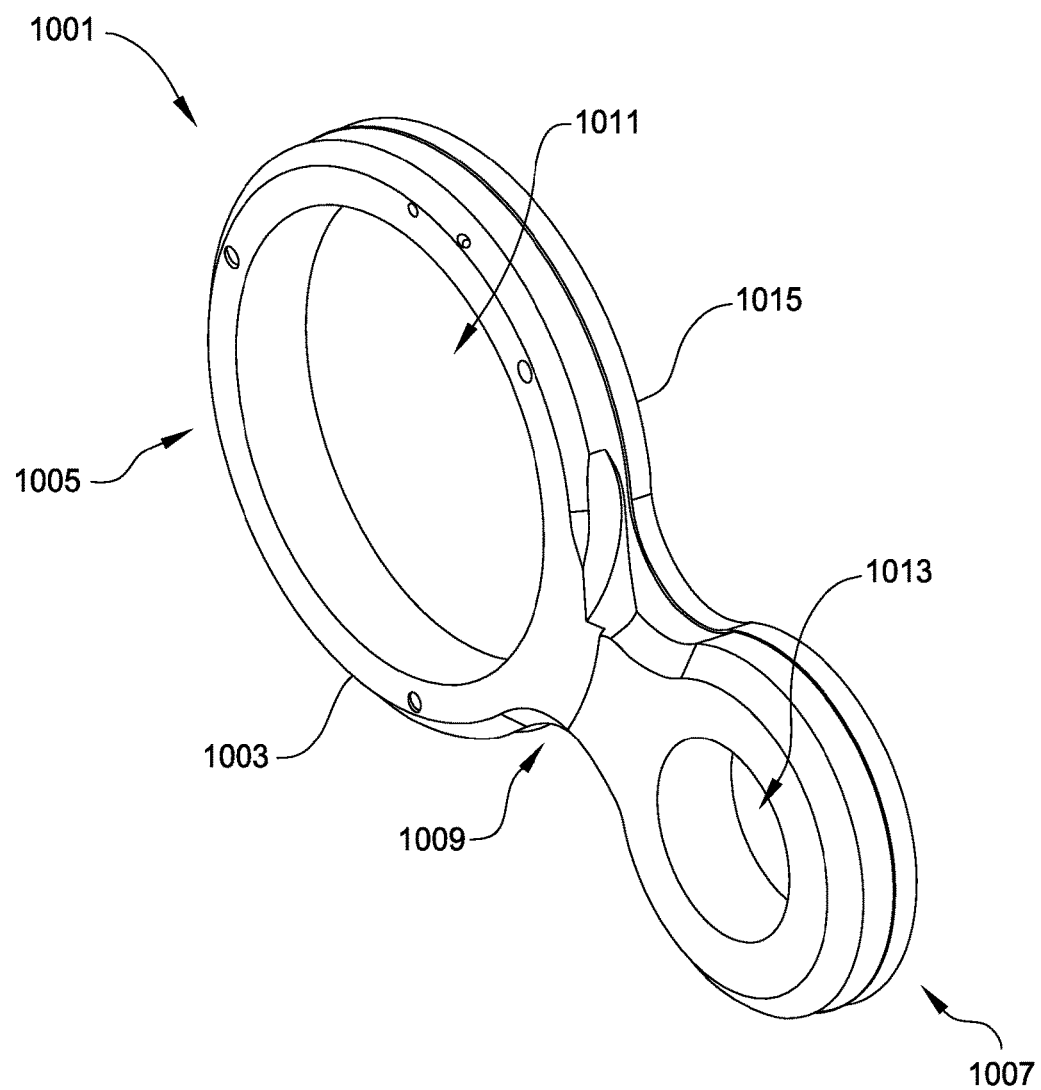
FIG. 10 is an oblique view of a support in accordance with an alternative embodiment of the present application.
Figure 11:
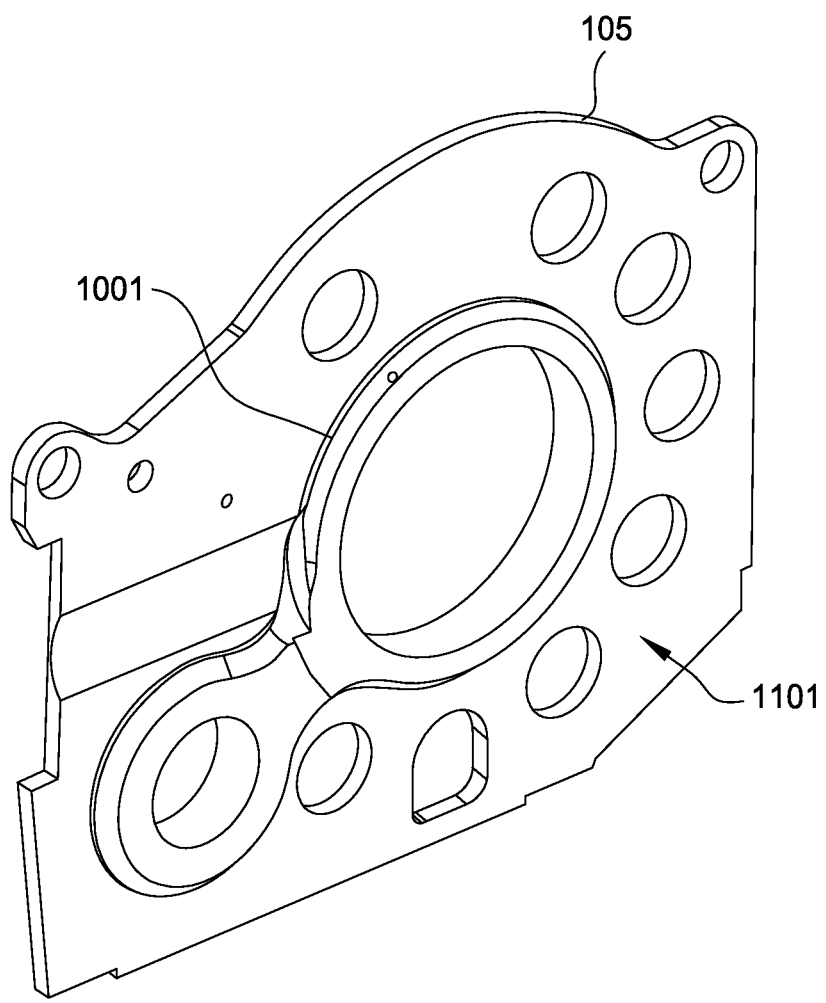
FIG. 11 is an oblique view of the support of FIG. 10 secured to a base plate.

Referring now to FIGS. 10 and 11 in the drawings, a support 1001 is shown in accordance with an alternative embodiment of the present application. It will be appreciated that support 1001 is substantially similar in form and function to support 103 and hereby incorporates one of more of the features discussed above.

In the contemplated embodiment, frame support 1001 is a robust and wide insert shaped to resemble a figure eight. In the preferred embodiment, support 1001 includes a body 1003 having a first circular end 1005 integrally joined to a second circular end 1007 via a transition member 1009. First end 1005 forms an opening 1011 that receives the bull gear, while second end 1007 forms an opening 1013 that receives a pinion gear. As shown, both opening 1011, 1013 are coaxially aligned with each other.

One of the unique features of support 1001 is the use of a flange 1015 that extends from body 1003 and is configured to engage with a front surface 1101 of plate 105, as shown in FIG. 11. In the preferred embodiment, the flange 1015 is welded to the front surface 1101; however, alternative embodiments could use different types of fastening means, e.g., bolts to secure the support to the front surface. Thus, in the contemplated embodiment, the support 1001 could be used to retrofit existing plate 105 embodiments by merely placing the support on the front surface and thereafter welding the flange thereto.

Use of the supports 103, 1001 on both ends of the power end have many advantages, including at least the following: (1) increasing bull gear and pinion service life; (2) increasing pinion bearing service life; (3) reducing catastrophic pinion bearing and failures; (4) eliminating power frame crack failures caused by gear separation forces; and (5) reducing power end horse power loses due to reduced gear deflection, which results in less friction.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

What is claimed is:
1. A power end assembly, comprising:
a power end having a bull gear and a pinion gear;
a plate coupled to the power end and having a first plate opening and a second plate opening; and
a pinion bearing support having a body; wherein the body has a first circular end forming a first opening configured to receive the bull gear therethrough; wherein the body has a second circular end forming a second opening configured to receive the pinion gear therethrough; wherein the body is disposed within the first plate opening and the second plate opening such that the first opening of the body is coaxially aligned with the first plate opening and the second opening is coaxially aligned with the second plate opening; and wherein the body is secured to the plate.

2. The assembly of claim 1, wherein the body has a transition member integrally attached to the first circular end and the second circular end.

3. The assembly of claim 1, wherein the body is a separate piece that is secured to the plate.

4. The assembly of claim 3, wherein the body is welded to the plate.

5. The assembly of claim 4, wherein the body is welded to an interior surface of the plate.

6. The assembly of claim 4, wherein the body is welded to an exterior surface of the plate.

7. The assembly of claim 1, wherein the body is secured to an interior surface of the plate.

8. The assembly of claim 1, wherein the body is secured to an exterior surface of the plate.

9. The assembly of claim 1, further comprising: a flange extending from the body.

10. The assembly of claim 9, wherein the flange is secured to an exterior surface of the first opening and the second opening of the plate.

11. The assembly of claim 10, wherein the flange is welded to the exterior surface of the plate.

12. The assembly of claim 1, wherein the first opening has a greater diameter than the second opening.

13. The assembly of claim 1, wherein the plate and the pinion bearing support are integrally formed as a single piece.

14. The assembly of claim 1, wherein the plate has a transition opening connecting the first plate opening and the second plate opening.

15. The assembly of claim 1, wherein the plate is thinner than the body.

16. The assembly of claim 1, wherein the body is disposed within the first plate opening and the second plate opening such that the first opening of the body is at least partially disposed within the first plate opening and the second opening is at least partially disposed within the second plate opening.

17. The assembly of claim 1, wherein the body has a transition member integrally attached to the first circular end and the second circular end, wherein the plate has a transition opening connecting the first plate opening and the second plate opening, and wherein the transition member is disposed within the transition opening such that the transition member is disposed between and separates the first opening and the second opening.

18. A power end assembly, comprising:
a power end having a bull gear and a pinion gear;
a plate having a first plate opening, a second plate opening, and a transition opening connecting the first plate opening and the second plate opening;
a pinion bearing support having a body; wherein the body has a first circular end forming a first opening coaxially aligned with the first plate opening and configured to receive the bull gear therethrough; and wherein the body has a second circular end forming a second opening coaxially aligned with the second plate opening and configured to receive the pinion gear therethrough; and
a flange extending from the body; wherein the body is secured to the plate via the flange.

19. The assembly of claim 18, wherein the body has a transition member integrally attached to the first circular end and the second circular end.

20. The assembly of claim 18, wherein the body is a separate piece that is secured to the plate.

21. The assembly of claim 20, wherein the body is welded to the plate.

22. The assembly of claim 18, wherein the first opening has a greater diameter than the second opening.

23. The assembly of claim 18, wherein the plate and the pinion bearing support are integrally formed as a single piece.

24. The assembly of claim 18, wherein the body is disposed within the first plate opening and the second plate opening such that the first opening of the body is at least partially disposed within and coaxially aligned with the first plate opening and the second opening is at least partially disposed within and coaxially aligned with the second plate opening.

25. The assembly of claim 18, wherein the plate is thinner than the body.

26. The assembly of claim 18, wherein the body has a transition member integrally attached to the first circular end and the second circular end, and wherein the transition member is disposed within the transition opening such that the transition member is disposed between and separates the first opening and the second opening.

\* \* \* \* \*